United States Patent
Shchepetov et al.

(10) Patent No.: US 9,058,223 B2
(45) Date of Patent: Jun. 16, 2015

(54) PARALLEL ENTROPY ENCODING ON GPU

(75) Inventors: Denis Sergeyevich Shchepetov, Sunnyvale, CA (US); Sridhar Sankuratri, Campbell, CA (US); Damien Gerard Saint Macary, Sunnyvale, CA (US); Paul Johan Hsieh, San Jose, CA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 546 days.

(21) Appl. No.: 13/092,713

(22) Filed: Apr. 22, 2011

(65) Prior Publication Data

US 2012/0268469 A1    Oct. 25, 2012

(51) Int. Cl.
| | |
|---|---|
| G06K 9/46 | (2006.01) |
| G06F 9/52 | (2006.01) |
| H04N 19/91 | (2014.01) |
| G06T 9/00 | (2006.01) |
| H04N 19/436 | (2014.01) |
| H04N 19/93 | (2014.01) |

(52) U.S. Cl.
CPC ............. *G06F 9/52* (2013.01); *H04N 19/91* (2014.11); *G06T 9/00* (2013.01); *G06T 9/005* (2013.01); *H04N 19/436* (2014.11); *H04N 19/93* (2014.11)

(58) Field of Classification Search
USPC ....................................................... 382/232
See application file for complete search history.

(56) References Cited

U.S. PATENT DOCUMENTS

| | | | |
|---|---|---|---|
| 5,583,500 A * | 12/1996 | Allen et al. | 341/107 |
| 5,751,232 A * | 5/1998 | Inoue et al. | 341/63 |
| 6,195,026 B1 * | 2/2001 | Acharya | 341/60 |
| 6,597,812 B1 | 7/2003 | Fallon et al. | |
| 7,460,725 B2 | 12/2008 | Malladi et al. | |
| 7,724,827 B2 * | 5/2010 | Liang et al. | 375/240.23 |
| 7,813,570 B2 | 10/2010 | Shen et al. | |
| 7,869,660 B2 * | 1/2011 | Reese | 382/239 |
| 8,180,165 B2 * | 5/2012 | Lu et al. | 382/236 |
| 8,406,307 B2 * | 3/2013 | Tu et al. | 375/240.23 |
| 8,509,555 B2 * | 8/2013 | Meany | 382/246 |
| 2004/0017855 A1 * | 1/2004 | Otsuka | 375/253 |
| 2006/0189614 A1 * | 8/2006 | Janssen et al. | 514/241 |
| 2007/0217704 A1 * | 9/2007 | Zeng et al. | 382/244 |
| 2007/0286512 A1 * | 12/2007 | Yokose et al. | 382/245 |
| 2008/0056348 A1 | 3/2008 | Lyashevsky et al. | |
| 2008/0298698 A1 * | 12/2008 | Taniguchi et al. | 382/245 |
| 2009/0148057 A1 * | 6/2009 | Chen et al. | 382/243 |

(Continued)

OTHER PUBLICATIONS

Fine-Grain parallelization of entropy coding on GPGPUs, Ana Balevic, IDS ref 7. Jul. 2009, pp. 1-4.*

(Continued)

*Primary Examiner* — Jayesh A Patel
(74) *Attorney, Agent, or Firm* — Bryan Webster; Kate Drakos; Micky Minhas

(57) ABSTRACT

An invention is disclosed for performing entropy encoding in a parallelized manner, using a GPU. In embodiments, an input sequence of integers is received, and run-length encoding is performed on any runs of zeros in parallel operations on the GPU. Then, a plurality of parallelized operations are performed on the run-length encoded sequence to entropy encode the sequence. The value N may be entropy encoded using only N and the value that precedes it in the sequence, N−1, so the encoding may be sub-divided into multiple operations that may be performed in parallel on the GPU. After entropy encoding is performed, a bitstream may be produced using parallelized operations on the GPU.

20 Claims, 5 Drawing Sheets

(56) References Cited

U.S. PATENT DOCUMENTS

| | | | |
|---|---|---|---|
| 2009/0323819 A1* | 12/2009 | Vidunas | 375/240.19 |
| 2010/0027625 A1* | 2/2010 | Wik et al. | 375/240.12 |
| 2010/0030748 A1 | 2/2010 | Netz et al. | |
| 2010/0104006 A1 | 4/2010 | Taylor et al. | |
| 2010/0117875 A1* | 5/2010 | Oslick | 341/59 |
| 2010/0135416 A1* | 6/2010 | Huang et al. | 375/240.24 |
| 2010/0290533 A1* | 11/2010 | Minagawa | 375/240.23 |
| 2011/0103469 A1* | 5/2011 | Lee | 375/240.03 |
| 2011/0216828 A1* | 9/2011 | Yang | 375/240.12 |
| 2011/0243467 A1* | 10/2011 | Igarashi | 382/234 |
| 2012/0177298 A1* | 7/2012 | Fujino | 382/232 |

OTHER PUBLICATIONS

Balevic, "Fine-Grain Parallelization of Entropy Coding on GPGPUs", Jul. 2009, 2011, 4 pages.

Haugen, "Seismic Data Compression and GPU Memory Latency", Master Thesis, Norwegian University of Science and Technology, Department of Computer and Information Science, Jun. 2009, 92 pages.

Martínez Bayona, "Space-optimized texture atlases", Master in Computing, UPC Master thesis, Sep. 8, 2009, 98 pages.

Rusnak, "Design and Implementation of Arithmetic Coder for CUDA Platform", Diploma Thesis, 2010, 77 pages.

Tokdemir, "DCT Implementation on GPU", Computer Science Theses, Apr. 12, 2006, 91 pages.

* cited by examiner

PARALLEL ENTROPY ENCODING ON GPU

BACKGROUND

In a remote presentation session, a client computer sends user input (such as keyboard presses and mouse movements) to a server computer, which processes the result of that input (such as executing an application), and sends back the output (e.g. graphics and audio) to the client computer for presentation. In this manner, applications may appear to execute locally on the client computer, when they are, in fact, processed on the server computer.

The graphical output produced by a server in a remote presentation session is often significant, especially compared with the bandwidth of a network connection between the server and the client. In some scenarios, bandwidth may be conserved by compressing the graphical output with lossy compression before transmitting it across the network connection, then decompressing it at the client. In lossy compression, some of the information is lost in the process of compression—the decompressed data may resemble the original data, but it is not an exact duplicate. Lossy compression is not always a viable possibility, such as in a situation where high resolution graphics must be duplicated exactly on the client computer. For instance, where a remote presentation session is used to transmit x-ray images of medical patients, any compression artifacts from lossy compression that appear in those x-ray images may compromise a physician's ability to properly evaluate the x-rays.

Thus, there are times where lossless compression is used in a remote presentation session. With lossless compression, the decompressed data is an exact duplicate of the original data. There are various techniques for lossless compression of data in a remote presentation session, including a class of techniques known as entropy encoding. In entropy encoding, data is encoded as if it were sequence of independent and identically-distributed random variables. There are, however, many drawbacks with entropy encoding for remote presentation systems, some of which are well known.

SUMMARY

One drawback with entropy encoding for remote presentation systems is that it is frequently performed in a serial manner. Performing entropy encoding serially generally takes more time than performing entropy encoding in a parallel manner. It would therefore, be an improvement over the prior art to provide an invention for performing entropy encoding in parallel.

In embodiments of the invention, a sequence of values is received for entropy encoding. This sequence of values is represented by an array of 16-bit integers, with each element of the array representing one value. Each of these values is provided to a different thread of a graphics processing unit (GPU) Then, in parallel, the threads are executed on the GPU to run-length compress the zeroes of the sequence of values, as well as to place a reserved value between each of the non-zero values to serve as a separator.

Each value of this run-length compressed sequence of values may then be associated with a different thread of the GPU, along with the non-padding value that precedes that value (e.g., value N and value N−1). Entropy encoding value N may be performed based only on these two values N and N−1. Then, in parallel, these N threads are executed on the GPU to perform entropy encoding of the values.

The entropy-encoded values are packed together into a bitstream and stored in a computer memory. This bit packing may also be performed in parallel. A sequence of operations to calculate the position of each entropy-encoded value may be performed in parallel for all of the entropy-encoded values.

DETAILED DESCRIPTION OF ILLUSTRATIVE EMBODIMENTS

Figure 1:
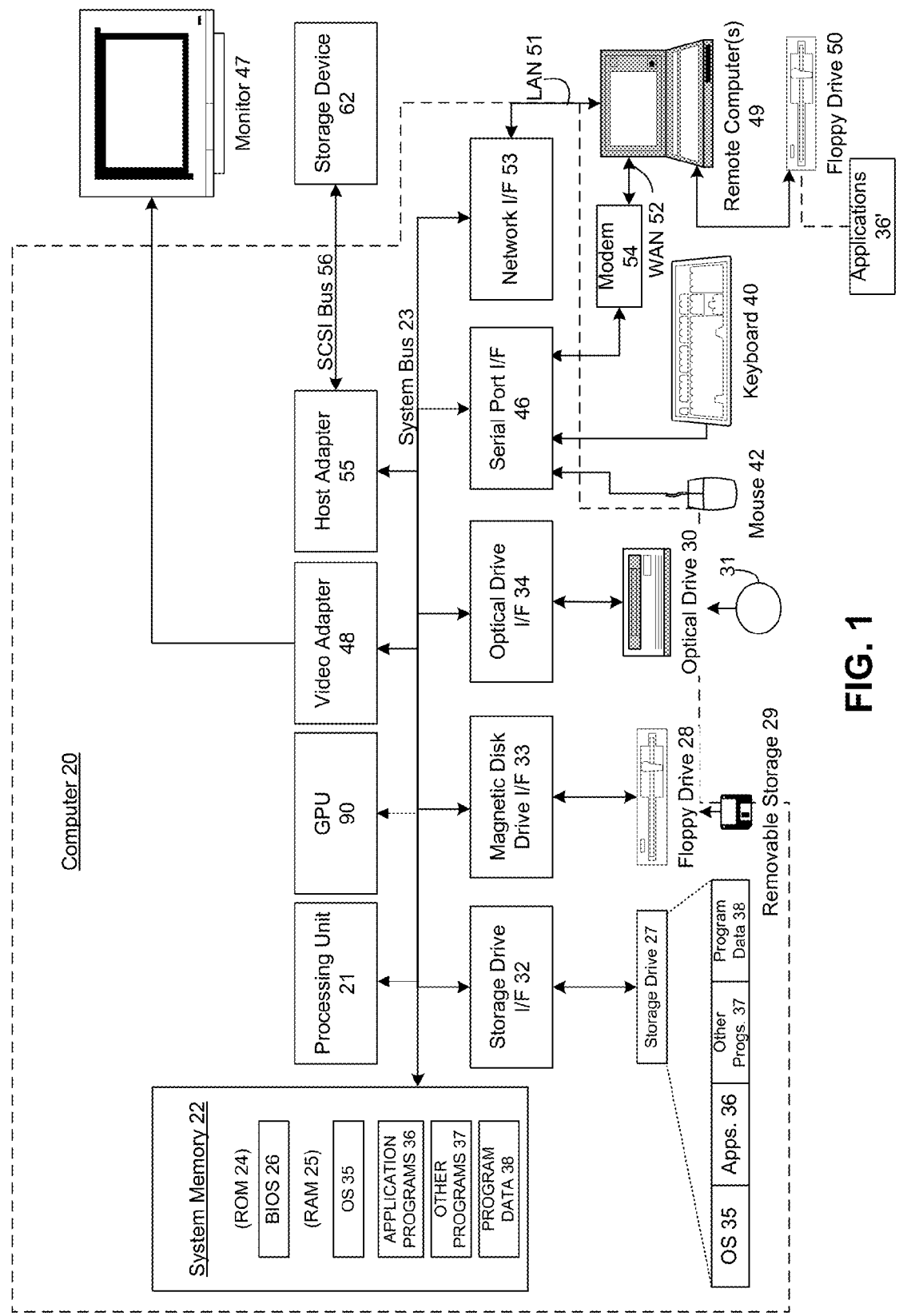
FIG. 1 depicts an example general purpose computing environment in which embodiments of the invention may be implemented.

Embodiments of the invention may execute on one or more computer systems. FIG. 1 and the following discussion are intended to provide a brief general description of a suitable computing environment in which embodiments of the invention may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21.

Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20. Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
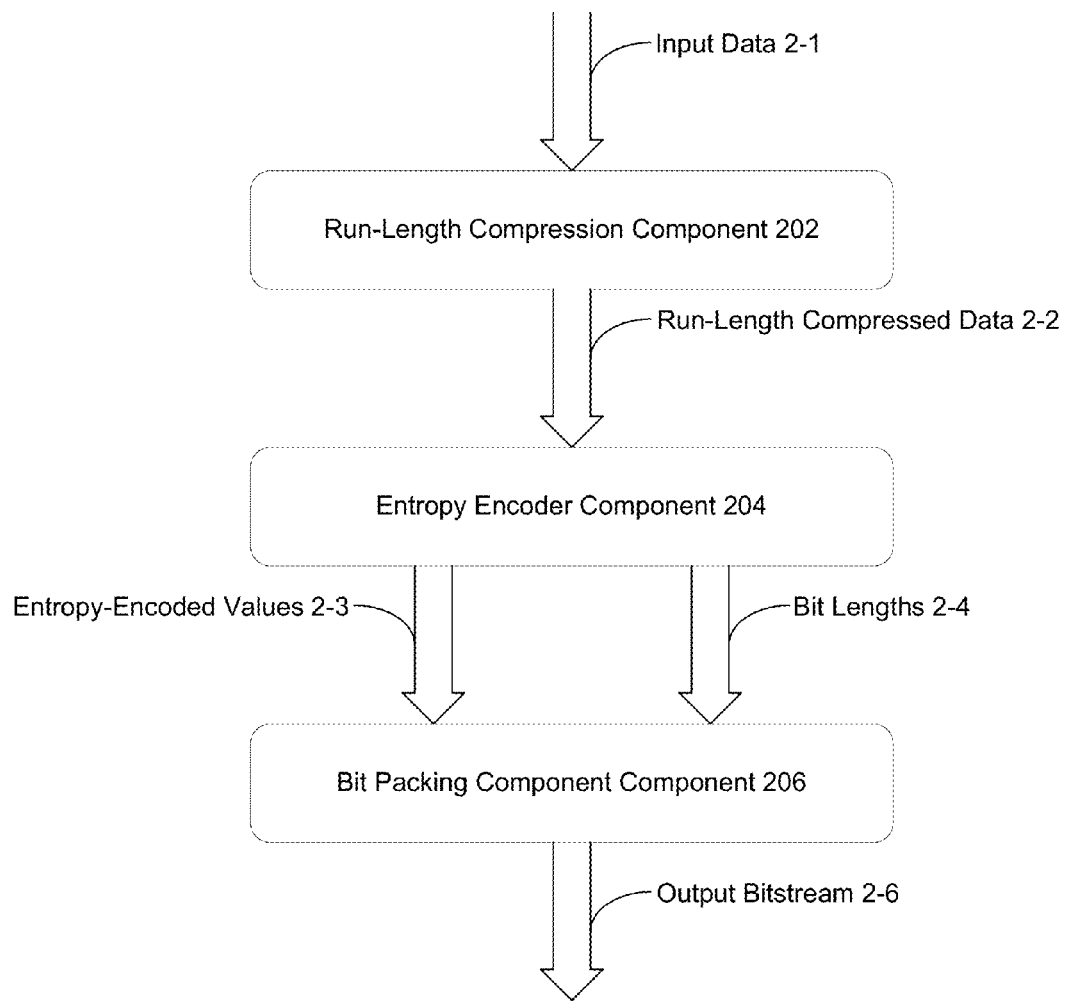
FIG. 2 depicts an example data flow for parallelized entropy encoding.

FIG. 2 depicts an example data flow for parallelized entropy encoding. The data flow of FIG. 2 may be implemented, for example, on computer 20 of FIG. 1 using GPU 90 to perform the parallelized operations. At 2-1, input data is received. This data may comprise, for example, an array of integers, with each array element representing one value of the input data. This input data 2-1 is received by a run-length compression component 202, which performs run-length compression on the data 2-1.

This run-length compression may comprise combining any consecutive values of 0 into one value that represents that run, as well as placing a reserved divider number in between any values. This run-length compression component 202 takes in the data 2-1 to produce the run-length compressed data of 2-2. This run-length encoded data of 2-2 may comprise an array of values, the same as the data of 2-1. However, the number of values stored in the arrays in 2-2 and 2-1 may be different. As compared to the array of 2-1, the array of 2-2 will have fewer values where the runs of zeroes are combined, and more values where a divider is placed between each value. As depicted, the arrays 2-1 and 2-2 are the same length, because the amount of space reduced by performing run-length encoding is exactly offset by the amount of space added with the dividers.

An entropy encoder component 204 takes in this run-length encoded data 2-2 as input, and from it, produces two outputs: entropy-encoded data 2-3 and bit-length data 2-4. Entropy-encoded data 2-3 comprises a set of values that encode the run-length encoded values of 2-2, and bit-length data 2-4 comprises a set of bit-lengths used to represent the values of data 2-3 in binary.

These two pieces of data, entropy-encoded data 2-3 and bit-length data 2-4 are used as input to bit packing component 206. Bit packing component 206 arranges the encoded values contiguously, such that there are no superfluous bits used. That is, where entropy-encoded data 2-3 and bit-length data 2-4 may be expressed as an array of values, such that each value is represented by the same number of bits (e.g. a 16-bit short data type), the output of bit packing component 2-6 eliminates these unnecessary bits. Where the bit-length used to encode a first value is 5 bits, and the bit-length used to encode a second value is 9 bits, then the output 2-5 of bit packing component 206 comprises 14 bits, rather than 32 bits (e.g. two 16-bit short data values).

In a remote presentation session, this output may be generated by a remote presentation sever (and the output may correspond to the graphical result of executing an application, and sent to a remote presentation client for display.

Each of these components of FIG. 2—run-length compression component 202, entropy encoder component 204, and bit-packing component 206—may be implemented using parallelized operations that execute on the GPU of a computer, such as on GPU 90 of computer 20 as depicted in FIG. 1.

With respect to run-length compression component 202, let there be N values in data 2-1 taken as input. These N values may be stored in an array of 16-bit short integers in 2*magnitude+ sign format. Run-length compression component 202 takes these N values and assigns each to a separate one of N threads that will execute on the GPU. The GPU may then compress runs of zeroes with a number that indicates how many zeroes are in the run, and inserts a reserved divider number in between all values (save for the contiguous zeros that get compressed). This operation of run-length compression and insertion of dividers may be performed by the N threads in $\log_2(N)$ iterations. This is a savings over a non-parallelized version of the operation, which typically requires N iterations to perform. The parallelized version may be performed in $\log_2(N)$ iterations, where, in each iteration, a value is compared with one of its neighbors (and if part of a run of zeros, combined with that neighbor). In the second iteration, half as many values are checked, and in the third iteration, half as many again. Through the sum of the iterations, the run-length encoding is performed in $\log_2(N)$ iterations.

With respect to inserting a divider between values, −1 may be used to signify such a divider, and negative numbers may also be used to compress runs of zeros. For instance, a run of zeros may be encoded as a negative of the number of zeros in the run, minus one. E.g. "0, 0, 0, 0"—four zeros, may be encoded as −(4)−1=−5. In such embodiments, negative numbers may be considered reserved because the values all have a range such that they are non-negative.

The operation of run-length compression component 202 may be expressed in pseudo-code in a C-style syntax as follows. It may be appreciated that, while pseudo-code that executes on a CPU and/or GPU is presented here, run-length compression component 202 may be implemented entirely in hardware, or a combination of hardware and code that executes on a CPU and/or GPU:

```
// For each thread
int RunLengthEncode(uint3 DTid : SV_GroupThreadID,
uint3 GI : SV_GroupID)
{
    uint logN = LOGN; //log2N, where N is the total number of elements.
    uint idx = DTid.x;
    uint shift = 1;
    GroupBuf[idx] = Buffer0[GI.x*TILESIZE + idx].i; //Buffer0 -
    input buffer
    // Convert non-zero to 1s
    lens[idx] = 0;
    if(GroupBuf[idx] != 0)
    {
      lens[idx] = 1;
    }
    // Prefix Sum
    for(uint i = 0; i < logN; i++)
    {
       uint sum = lens[idx];
       if(idx >= shift)
       {
          sum += lens[idx - shift];
       }
       shift <<= 1;
       GroupMemoryBarrierWithGroupSync( );
       lens[idx] = sum;
       GroupMemoryBarrierWithGroupSync( );
    }
    uint size = lens[TILESIZE−1];
    // Fillout the output buffer with non-zero values
    uint outIdx = lens[idx]−1;
    zeroRuns[idx] = 0;
    if(GroupBuf[idx] != 0)
    {
      vals[outIdx] = GroupBuf[idx]; // output buffer for non-zero values.
      lens[outIdx] = idx+1;
    }
    GroupMemoryBarrierWithGroupSync( );
    // Filling out the output buffer with zero runs
    if(GroupBuf[idx] != 0)
    {
      int zeroRun = lens[outIdx] − lens[outIdx−1]; // output buffer for zero runs.
      zeroRuns[outIdx] = zeroRun;
    }
    GroupMemoryBarrierWithGroupSync( );
    return size;
}
```

Entropy encoder 204 may likewise operate in a parallelized manner. Entropy encoder 204 may encode a value X of run-length encoded data 2-2 based only on that value X, and the non-zero value X−1 that comes before it in data 2-2. Since X may be encoded based solely on itself and X−1, and both of these values are already known as part of data 2-2, these operations to encode each value may be executed in parallel. The first value may be assigned to a thread, along with a signifier that there is no value that comes before it, and each additional value may be assigned to a separate thread, along with the value that comes before it (that is not an encoded run of zeroes). In that manner, a particular value may be assigned to two threads, though it will only be encoded by one of those threads. That is, the value X may be assigned to two threads. It may be assigned to the thread that encodes X (along with X−1), and it may be assigned to the thread that encodes X+1 (so that X+1 may be encoded). Since each value may be encoded in parallel (where the number of threads that may execute in parallel on the GPU is not less than the number of values to be encoded), all the values may be encoded in one parallelized iteration on the GPU, and this operation of entropy encoding may be performed in constant time.

The encoded runs of zeros are unchanged, and are associated with a bit-length that indicates how many bits are used to encode that value that represents the encoded run of zeros.

The operation of entropy-encoding component 204 may be expressed in pseudo-code in a C-style syntax as follows. It may be appreciated that, while pseudo-code that executes on a CPU and/or GPU is presented here, entropy-encoding compression component 204 may be implemented entirely in hardware, or a combination of hardware and code that executes on a CPU and/or GPU:

```
// For each thread
void EntropyEncode(uint3 DTid : SV_GroupThreadID,
uint3 GI : SV_GroupID)
{
   uint idx = DTid.x;
   uint val = 0;
   uint len = 0;
   uint lenRun = 0;
```

```
val = vals[idx]; // vals - input buffer with non-zero values.
uint zeroRun = zeroRuns[idx]; // zeroRuns - input buffer with zero runs.
lenRun = firstbithigh(zeroRun)+1;
lenRun = (2*lenRun-1);
// non-zero value
len = firstbithigh(val)+1;
int lenPrev = firstbithigh(vals[idx-2+1])+1;
int diff = len-lenPrev;
if(diff>0)
{
   val |= (1<<(len+diff-1));
   len = len + diff - 1 + 2;
}
else if(diff<0)
{
   diff=-diff;
   len = len + diff - 1 + 2;
}
else
{
}
valsOut[idx] = (zeroRun<<len) | val; // valsOut - output buffer with
encoded values.
lens[idx] = len + lenRun; // lens - output buffer with bit lengths.
}
```

Entropy-encoding component 204 outputs both the encoded values 2-3 as well as values 2-4 that signify how many bits are used to represent each encoded value. These outputs may each be represented as an array of 16-bit integers, like data 2-1 and 2-2.

Bit packing component 206 may likewise execute using parallelized operations on the GPU. Bit packing component takes as input data 2-1 and 2-2, and using M threads (M being equal to the number of values in data 2-3), may perform this operation of bit packing in $\log_2(M)$ iterations. This is a savings over a non-parallelized version of the operation, which typically requires M iterations to perform. Similar to how run-length compression component 202 performs successive iterations where a value is compared to a neighbor to determine runs of zeros, here, successive iterations may be performed to calculate the sum of the bit-length of a value and its neighbor, and through these successive iterations, the bit-length from the start of a bitstream to a particular value may be determined. The bit-length from the start of the bitstream to each value will be known after $\log_2(M)$ iterations, though the bit-length from the start of the bitstream to some values will be known in fewer iterations.

The operation of bit-packing component 206 may be expressed in pseudo-code in a C-style syntax as follows. It may be appreciated that, while pseudo-code that executes on a CPU and/or GPU is presented here, bit-packing component 206 may be implemented entirely in hardware, or a combination of hardware and code that executes on a CPU and/or GPU:

```
// For each thread
int BitPack_interlock(uint3 DTid : SV_GroupThreadID,
uint3 GI : SV_GroupID, uint size)
{
   uint logN = LOGN; // do change to log(num_coeffs)
   uint idx = DTid.x;
   uint valLen = lens[idx]; // lens - input buffer with encoded lengths.
   GroupMemoryBarrierWithGroupSync( );
   uint shift = 1;
   uint sum = 0;
   // Prefix Sum
   for(uint i = 0; i < logN; i++)
   {
      sum = lens[idx];
```

```
      if(idx >= shift)
      {
         sum += lens[idx - shift];
      }
      shift <<= 1;
      GroupMemoryBarrierWithGroupSync( );
      lens[idx] = sum;
      GroupMemoryBarrierWithGroupSync( );
   }
   uint totalShift = lens[idx-1];
   uint bitShift = totalShift%32;
   uint intShift = totalShift/32;
   uint avail = 32 - bitShift;
   int diff = avail - valLen;
   uint val = vals[idx]; //vals - input buffer with encoded values.
   tmp[idx] = 0;
   GroupMemoryBarrierWithGroupSync( );
   uint left = val;
   uint right = val;
   if(diff >= 0)
   {
      left <<= diff;
      right = 0;
   }
   else //(diff<0)
   {
      left >>= -diff;
      right <<= 32 + diff;
   }
   InterlockedOr(tmp[intShift], left);
   InterlockedOr(tmp[intShift+1], right);
   GroupMemoryBarrierWithGroupSync( );
   BufferOut[GI.x*TILESIZE + idx].i = tmp[idx]; //BufferOut -
buffer with bit stream
   return lens[TILESIZE-1];
}
```

Figure 3:
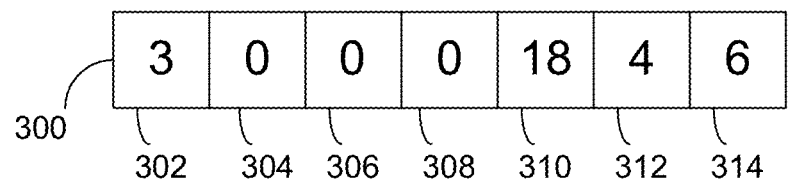
FIG. 3 depicts an example set of input values to be entropy encoded.

FIG. 3 depicts an example set of input values to be encoded. The set of input values may be the input data 2-1 of FIG. 2. As depicted, the input data comprises values 302-314, which are 3, 0, 0, 0, 18, 4, and 6, respectively and these values are stored in an array 300 of 16-bit integers. Even the value that requires the most bits to express in binary form, 18 (which requires 5 bits to do so, as 0b10010), is still stored using 16 bits. At least some of these excess 11 bits may be removed in the encoding process of FIG. 2, without eliminating the ability to reproduce the number 18 via decoding, producing a lossless compression.

Figure 4:
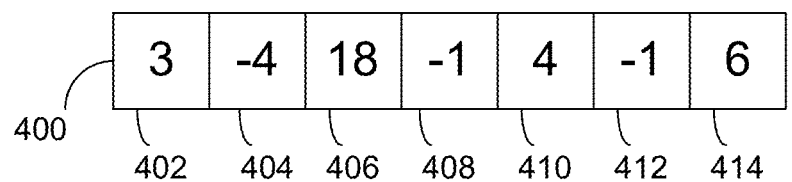
FIG. 4 depicts the set of input values of FIG. 3 produced by performing parallelized run-length encoding has been performed on the values.

FIG. 4 depicts the set of input values of FIG. 3 after parallelized run-length encoding has been performed on them. As depicted, this encoded data comprises values 402-414, which are 3, -4, 18, -1, 4, -1, and 6, respectively, stored in array 400. The first value in each of array 300 and array 400 (respectively, 302 and 402) is 3. This value of 3 remains unchanged between arrays because it is not equal to zero, and thus not encoded. Then value 404, which is -4, represents all of values 304, 306, and 308—a run of three zeros. Those three zeros are represented as a negative number equal to the negative of the number of zeros, minus 1. Here, that is -(3)-1=-4. Value 406 is 18, the same as value 310 (again, unchanged because it is not part of a run of zeros). Value 408 is -1, a reserved number used as a divider between non-zero values from array 300. Value 410 is 4, same as value 312. Value 412 is another divider of -1. Finally, value 414 is 6, same as value 314.

In embodiments, inserting a reserved divider number between nonzero values may be useful in increasing the speed at which an entropy encoder may operate.

Figure 5:
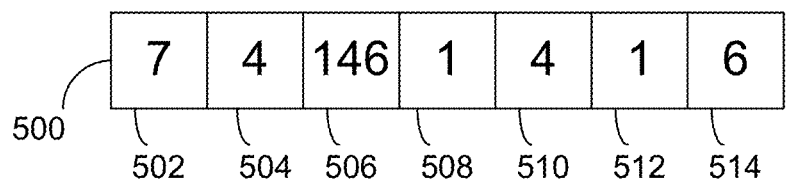
FIG. 5 depicts an example set of output values produced by performing parallelized entropy encoding on the set of values produced in FIG. 4.

FIG. 5 depicts an example set of output values produced by performing parallelized entropy encoding on the set of values produced in FIG. 5. In an embodiment, these values 502-514 are stored in array 500 as 16-bit short integers. The output values of FIG. 5 may be viewed in conjunction with the set of bit-lengths of FIG. 6, which specifies how many bits each value of FIG. 5 will be represented with. The rightmost bits of each of the values contained within array 500 of FIG. 5 equals the value of the corresponding value contained within array 400 of FIG. 4. That is, value 502 is 7, or 0b111, and corresponding value 402 is 3, or 0b11. The rightmost two bits of 0b111 are equal to 0b11. Likewise, value 506 is 146, or 0b10010010, and corresponding value 406 is 18, or 0b10010. The rightmost 5 bits of 0b10010010 are equal to 0b10010. This likewise applies for values 504 and 404, 508 and 408, 510 and 410, 512 and 412, and 514 and 414.

As will be explained with respect to FIG. 6, those leftmost bits of a value of array 500 that are not used to store the corresponding value of array 400 are used to signify the number of bits with which the value of array 400 is encoded.

Figure 6:
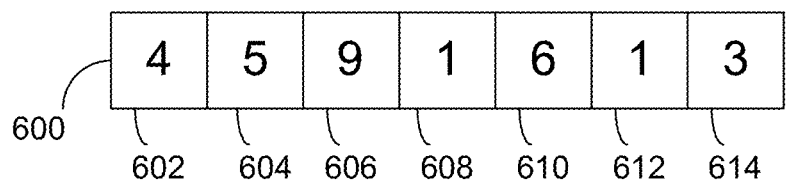
FIG. 6 depicts an example set of bit-lengths corresponding to the output values of FIG. 5.

FIG. 6 depicts an example set of bit-lengths for the output values of FIG. 5. In an embodiment, these bit lengths 602-614 are stored in array 600 as 16-bit short integers. For example, bit length 602 is 4, signifying that value 502 will be represented using 4 bits. Value 502 is 7, which can be represented using 3 bits—0b111. Even though 7 can be represented using 3 bits, 4 bits will be used to represent is according to the entropy encoding scheme—0b0111. Likewise, value 504—4—can be represented using 3 bits (0b100), but according to bit length 604 shall be represented using 5 bits (0b00100) according to the entropy encoding scheme. The same applies for bit lengths and values 606 and 506, 608 and 508, 610 and 510, 612 and 512, and 614 and 514, respectively.

Those leftmost bits not used to represent the value in array 400 may be used to determine how many bits are used to represent the value. For instance, value 406 is 18, entropy-encoded value 506 is 146 and bit-length 606 is 9. That is, 146 is encoded with 9 bits as 0b010010010. The five rightmost bits of 0b010010010 (0b10010) encode 18 in binary, and then the remaining 4 leftmost bits (0b0100) are used to signify how many total bits are used to encode 18 with the entropy encoder. Where the leftmost bit is 0, this signifies that the number of bits used to represent the value in array 400 differs from the number of bits used to represent the previous value in array 400 (for the first element of array 400, this is determined relative to one bit). Where the leftmost bit is 1, this signifies that the number of bits used to represent the value in array 400 does not differ from the number of bits used to represent the previous value in array 400 (and, in fact, signifies that there are no "leftmost bits" as the term is used herein; that leftmost 1 is the first bit of the rightmost bits—the value itself).

Where the leftmost bit is zero (signifying a change to the number of bits used to represent a value in array 400 relative to the value before it), the second leftmost bit signifies whether the number of bits is to be increased or decreased. A 1 signifies an increase and a zero signifies a decrease. The number of zeros that follow this second bit signify the amount of increase or decrease. The amount of increase or decrease is equal to one more than the number of these zeros. Then, the next leftmost 1 is both a terminator for this run of zeros, and the first bit of representing the value in array 400 itself (e.g. the first rightmost bit as the term is used herein).

Figure 7:
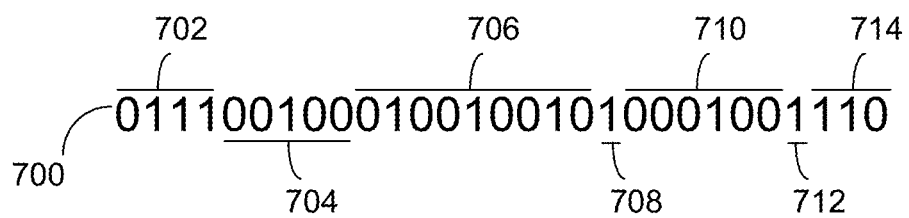
FIG. 7 depicts an example bitstream produced by bit-packing the set of entropy-encoded output values of FIG. 5 using the bit-lengths of FIG. 6.

FIG. 7 depicts an example bitstream 700 produced by bit-packing the set of output values of FIG. 5 using the bit-lengths of FIG. 6. There are 4 bits in 702, representing a binary encoding of 7, and the two rightmost bits encode 3. These numbers—4, 7, and 3—are the bit-length 602, entropy-encoded value 702, and run-length-encoded value 402, respectively. Likewise, bits 704 is made up of 5 bits, as specified by bit-length 604 as the number of bits to be used to express entropy-encoded value 504. Similar relationships hold for bits 706-714, bit-lengths 606-614, and entropy-encoded values 506-514.

Whereas all of the values in arrays 300, 400, 500 and 600 may be stored as 16-bit shorts with superfluous leading zeros, the output bitstream 700 of bit packing component 206 removes these leading zeros to compress the representation of the values in original input array 200. For instance, where 16-bit shorts are used to represent the values in array 200, this would require 112 bits (7 values at 16 bits per value). However, these same 7 values may be represented in bitstream 700 with only 29 bits, as depicted, which is a savings of nearly 75%.

Figure 8:
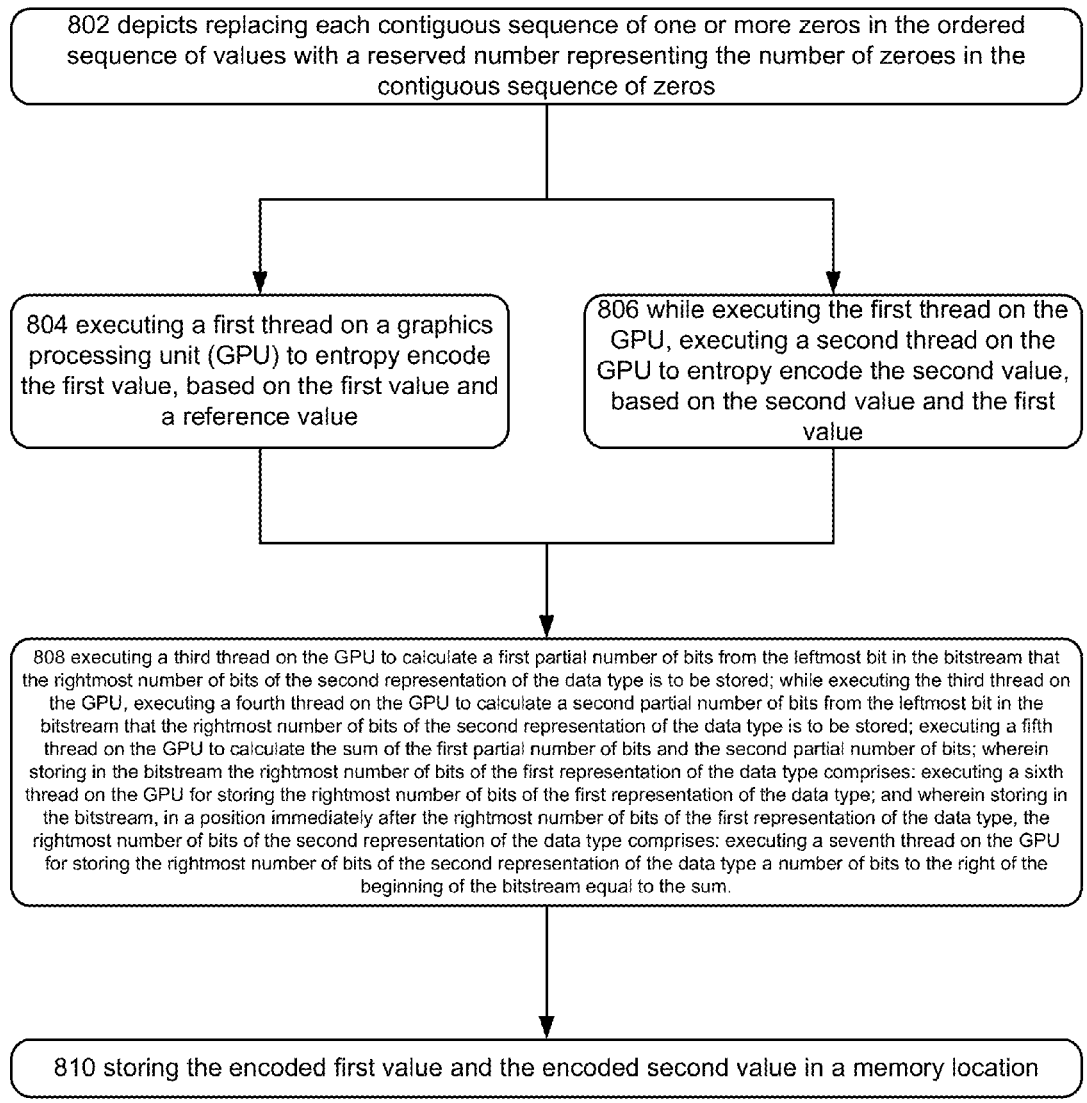
FIG. 8 depicts example operational procedures for parallelized entropy encoding.

FIG. 8 depicts example operational procedures for parallelized entropy encoding. The operational procedures may be implemented, for example, on computer 20 of FIG. 1, operations performed by a GPU performed by GPU 90. It may be appreciated that there are embodiments of the invention where not all operations depicted in FIG. 8 are performed, or where the operations are depicted in a different order than depicted in FIG. 8. As depicted, the operational procedures are used to entropy encode a first and a second value.

The first and second values may be part of an ordered sequence of values, such as the ordered sequence of values in array 300 of FIG. 3. Operation 802 depicts replacing each contiguous sequence of one or more zeros in the ordered sequence of values with a reserved number representing the number of zeroes in the contiguous sequence of zeros, the reserved number having a value outside of a range of values allowed for the first value or the second value. This may, for example, comprise the run-length encoding performed by run-length encoding component 202 of FIG. 2. In embodiments where the first and second values are part of an ordered sequence of values, the first value may referenced by a first element of an array and the second value is referenced by a second element of the array. That is, the first value may be referenced by the first element (sometimes referred to as the "zeroth" element where addressing an element begins with zero) of the array, and the second value may be referenced by the next element of the array. This reference of the value may comprise storing the value in the array. For instance, where the array is an array of 16-bit integers, each value may be stored as a 16-bit integer in the array.

In embodiments, operation 802 may also comprise inserting a second reserved number into the ordered sequence between each pair of non-zero values, the reserved number having a value outside of a range of values allowed for the first value, the second value, or the numbers userd to represent zeros. For instance, where the first and second value are greater than zero, and a run of zeros is represented by a number less than −1, the reserved number may be −1. This may comprise, for example, the insertion of a reserved number performed by the run-length encoding component 202 of FIG. 2.

Operation 804 depicts executing a first thread on a graphics processing unit (GPU) to entropy encode the first value, based on the first value and a reference value. This may comprise, for example, the entropy encoding performed by entropy encoder 202 of FIG. 2. A value may be entropy encoded based only upon its value and the value that precedes it (e.g. value N may be calculated based on value N and value N−1). Where the value is the first value in a list and has no value that precedes it, it may be entropy encoded based on itself and a reference value (such as a reference value of 1). In the present embodiment, the first value has no value that precedes it in the list, and is entropy encoded based on a reference value.

In embodiments, the encoded first value comprises a right prefix representing a rightmost number of bits, and executing a first thread on a graphics processing unit (GPU) to entropy encode the first value, based on the first value and a reference value comprises: executing the first thread on a graphics processing unit (GPU) to entropy encode the first value, such that the binary representation of the first value equals the binary representation of the right prefix. For instance, value 310 of FIG. 3 is 18 (or 0b10010), and is entropy encoded to 146 (or 0b10010010). The five bits that make up the right prefix of 0b10010010—0b10010—are the binary representation of the 18 that was entropy encoded.

In embodiments, the encoded first value comprises an indication of a difference of the number of bits used to represent the reference value in binary and the number of bits used to represent the first value in binary. In embodiments, the encoded first value comprises a most significant portion and a least significant portion when represented in binary, the most significant portion comprises the indication, and the least significant portion represents the first value in binary.

For example, let the reference value be 1. The first value in the array 400 to be entropy encoded is value 402, which is 3. 3 is expressed in binary using 2 bits, as 0b11. This is one more bit than is used to express the reference value of 1 in binary (0b1). Therefore, 3 is entropy encoded to express this as 0b0111. Those leftmost of those bits—0—signifies that a different number of bits is used to express 3 in binary than express 1 in binary. The second of those bits from the left is 1, which indicates that it requires at least one more bit to express 3 in binary than it does to express 1 in binary. Then, the final two bits, are the binary expression of 3 itself—0b11. Therefore, these two leftmost bits, or the two most significant bits (when viewed from a big-endian perspective)—0b01 comprise an indication of the difference of the number of bits used to represent the reference value in binary and the number of bits used to represent the first value in binary. Additionally, the two rightmost bits, or the two least significant bits—0b11—comprise a representation of the first value (3) in binary.

In embodiments, the encoded second value comprises an indication of a difference of the number of bits used to represent the first value in binary and the number of bits used to represent the second value in binary. In embodiments, the encoded second value comprises a most significant portion and a least significant portion when represented in binary, the most significant portion comprises the indication, and the least significant portion represents the second value in binary. This may be similar to the relationship between the first value and the reference value as discussed above. However, here the relationship is between the second value and another value of the list of values to be entropy encoded—the first value.

Operation 806 depicts while executing the first thread on the GPU, executing a second thread on the GPU to entropy encode the second value, based on the second value and the first value. Given that a value N may be entropy encoded knowing only the value N as well as the value that precedes it, N−1, it is possible to subdivide entropy encoding a sequence of values into multiple tasks. Where there are X number of values to be encoded, they may be encoded in parallel as X number of separate tasks. Here, where a first value and a second value are both to be entropy encoded, this may be done in parallel using two threads on the GPU. The thread that is used to entropy encode the second value may perform this function being provided with only the first value and the second value among a set of values that may be much larger than two. Then, this thread may be executed on the GPU in parallel with the first thread, which is used to entropy encode the first value.

In embodiments, the representation of the first number of bits and the representation of the second number of bits are part of an ordered sequence of values. In such embodiments, Operation 808 depicts executing a third thread on the GPU to calculate a first partial number of bits from the leftmost bit in the bitstream that the rightmost number of bits of the second representation of the data type is to be stored; while executing the third thread on the GPU, executing a fourth thread on the GPU to calculate a second partial number of bits from the leftmost bit in the bitstream that the rightmost number of bits of the second representation of the data type is to be stored; executing a fifth thread on the GPU to calculate the sum of the first partial number of bits and the second partial number of bits; wherein storing in the bitstream the rightmost number of bits of the first representation of the data type comprises: executing a sixth thread on the GPU for storing the rightmost number of bits of the first representation of the data type; and wherein storing in the bitstream, in a position immediately after the rightmost number of bits of the first representation of the data type, the rightmost number of bits of the second representation of the data type comprises: executing a seventh thread on the GPU for storing the rightmost number of bits of the second representation of the data type a number of bits to the right of the beginning of the bitstream equal to the sum. As discussed with respect to FIG. 2, the bit packing component 206 may execute in a parallelized manner to both determine a placement of a particular encoded value in the bitstream, as well as copy that particular encoded value to its place. A first iteration of calculating these placements may occur by executing the third thread and the fourth thread in parallel to determine two partial sums of where the encoded second value is to be placed within the bitstream. Then, an additional iteration may performed using the fifth thread to find the precise placement of the second value.

Likewise, where all placements of encoded values are known, copying those encoded values to their place within the bitstream may be performed in a parallel manner by the GPU. Little calculation needs to be performed to determine the position of the encoded first value within the bitstream—its location is at the start of the bitstream. With the position for the encoded second value being known as the result of executing the fifth thread, an operation may occur to copy the encoded first value to its position (using the sixth thread) and to copy the encoded second value to its position using the seventh thread). Both the sixth and seventh threads may execute in parallel on the GPU to perform this copying.

While this operation describes the use of seven threads, it may be appreciated that some of these threads may refer to the same thread as across iterations. That is, they are not necessarily destroyed at the end of an interation and created anew, but rather, re-used between iterations.

Operation 810 depicts storing the encoded first value and the encoded second value in a memory location. Once the first value and the second value have been entropy encoded, they may be stored in a memory location of computer 20 of FIG. 1. This memory location may be, for example, video memory of GPU 90, system memory 22, or some other memory accessible by computer 20.

In embodiments, operation 810 storing a reference to a first number of bits and a reference to a second number of bits in a second memory location, the first number of bits representing the encoded first value in binary, and the second number of bits representing the encoded second value in binary. That is, the entropy encoded values may be stored, and an indication of the number of bits that are used to entropy encode those values may also be stored. This may comprise storing the values in arrays 500 and 600, respectively.

In embodiments executing a first thread on a graphics processing unit (GPU) to entropy encode the first value comprises: executing the first thread on the GPU to determine the reference to the first number of bits, based on the first value and the reference value; and executing the second thread on the GPU to entropy encode the second value comprises: executing the second thread on the GPU to determine the reference to the second number of bits, based on the second value and the first value. This may comprise, for example, entropy encoder component 206 of FIG. 2 producing output of both the entropy-encoded values 2-3 as well as the length in bits used to encode those values 2-4.

In embodiments, the first value is stored as a first representation of a data type and the second value is stored as a second representation of the data type, the data type having a number of data type bits, the number of data type bits being greater than the representation of the first number of bits or the representation of the second number of bits. In such embodiments, operation 808 includes storing in a bitstream the rightmost number of bits of the first representation of the data type equal to the representation of the first number of bits; and storing in the bitstream, in a position immediately after the rightmost number of bits of the first representation of the data type, the rightmost number of bits of the second representation of the data type equal to the representation of the second number of bits. That is, a value encoded by entropy encoder component 204 may be stored as a 16-bit short data type value. However, all 16-bits may not be necessary to represent the encoded value. For instance, encoded value 502 (representing 7) is shown by bit length 602 to use 4 bits for the entropy encoding. In this sense, 12 of those 16 bits used to store encoded value 502 are unnecessary. When the value is stored in the bitstream, these unnecessary 12 bits are not stored with it, thus compacting the total number of bits used to store the values.

While the present disclosure has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with computer-readable storage media and/or computer-readable communication media. Thus, the invention, or certain aspects or portions thereof, may take the form of program code (i.e., instructions) embodied in tangible media, such as floppy diskettes, CD-ROMs, hard drives, or any other machine-readable storage medium. Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method, comprising:
   encoding a data with a first encoding scheme to produce an ordered set of values comprising a first value, a second value, and a third value, the first value preceding the second value and the third value in the ordered set, the second value preceding the third value in the ordered set;
   executing a first thread on a graphics processing unit (GPU) to encode the first value with a second encoding scheme, based on the first value and a reference value, the reference value being separate from the data and the ordered set of values;
   while executing the first thread on the GPU, executing a second thread on the GPU to encode the second value with the second encoding scheme, based on the second value and the first value;
   while executing the first thread on the GPU, executing a third thread on the GPU to encode the third value with the second encoding scheme, based on the third value and the second value; and
   storing the encoded first, second, and third values in a memory location.

2. The method of claim 1, wherein the first value and the second value belong to an ordered sequence of values, and further comprising:
   before executing the first thread, replacing each contiguous sequence of one or more zeros in the ordered sequence of values with a reserved number representing the number of zeroes in the contiguous sequence of zeros, the reserved number having a value outside of a range of values allowed for the first value or the second value.

3. The method of claim 2, further comprising:
   inserting a second reserved number into the ordered sequence between each pair of non-zero values, the reserved number having a value outside of a range of values allowed for the first value, the second value, or a value used to represent zero.

4. The method of claim 1, wherein the encoded first value comprises a right prefix representing a rightmost number of bits, and wherein executing the first thread on the GPU to encode the first value with the second encoding scheme, based on the first value and the reference value comprises:
   executing the first thread on the GPU to encode the first value with the second encoding scheme, such that the binary representation of the first value equals the binary representation of the right prefix.

5. The method of claim 1, wherein storing the encoded first value and the encoded second value in a memory location further comprises:
   storing a reference to a first number of bits and a reference to a second number of bits in a second memory location, the first number of bits representing the encoded first value in binary, and the second number of bits representing the encoded second value in binary.

6. The method of claim 5, wherein,
   executing first thread on the GPU to encode the first value with the second encoding scheme comprises:
     executing the first thread on the GPU to determine the reference to the first number of bits, based on the first value and the reference value; and
   wherein, executing the second thread on the GPU to encode the second value with the second encoding scheme comprises:
     executing the second thread on the GPU to determine the reference to the second number of bits, based on the second value and the first value.

7. The method of claim 5, wherein the first value is stored as a first representation of a data type and the second value is stored as a second representation of the data type, the data type having a number of data type bits, the number of data type bits being greater than the representation of the first number of bits or the representation of the second number of bits, and further comprising:
- storing in a bitstream the rightmost number of bits of the first representation of the data type equal to the representation of the first number of bits; and
- storing in the bitstream, in a position immediately after the rightmost number of bits of the first representation of the data type, the rightmost number of bits of the second representation of the data type equal to the representation of the second number of bits.

8. The method of claim 7, wherein the representation of the first number of bits and the representation of the second number of bits are part of an ordered sequence of values, and further comprising:
- executing a third thread on the GPU to calculate a first partial number of bits from the leftmost bit in the bitstream that the rightmost number of bits of the second representation of the data type is to be stored;
- while executing the third thread on the GPU, executing a fourth thread on the GPU to calculate a second partial number of bits from the leftmost bit in the bitstream that the rightmost number of bits of the second representation of the data type is to be stored;
- executing a fifth thread on the GPU to calculate the sum of the first partial number of bits and the second partial number of bits;
- wherein storing in the bitstream the rightmost number of bits of the first representation of the data type comprises:
  - executing a sixth thread on the GPU for storing the rightmost number of bits of the first representation of the data type; and
- wherein storing in the bitstream, in a position immediately after the rightmost number of bits of the first representation of the data type, the rightmost number of bits of the second representation of the data type comprises:
  - executing a seventh thread on the GPU for storing the rightmost number of bits of the second representation of the data type a number of bits to the right of the beginning of the bitstream equal to the sum.

9. The method of claim 1, wherein the encoded first value comprises an indication of a difference of the number of bits used to represent the reference value in binary and the number of bits used to represent the first value in binary.

10. The method of claim 9, wherein the encoded first value comprises a most significant portion and a least significant portion when represented in binary, the most significant portion comprises the indication, and the least significant portion represents the first value in binary.

11. The method of claim 10, wherein the encoded second value comprises a most significant portion and a least significant portion when represented in binary, the most significant portion comprises the indication, and the least significant portion represents the second value in binary.

12. The method of claim 1, wherein the first value is referenced by a first element of an array and the second value is referenced by a second element of the array.

13. A system, comprising:
- a processor; and
- a memory communicatively coupled to the processor when the system is operational, the memory bearing processor-executable instructions that, when executed on the processor, the system at least to:
  - encode data with a first encoding scheme to produce a first value and a second value;
  - execute a first thread on a graphics processing unit (GPU) to encode the first value with a second encoding scheme, based on the first value and a reference value;
  - while executing the first thread on the GPU, execute a second thread on the GPU to encode the second value with the second encoding scheme, based on the second value and the first value; and
  - store the encoded first value and the encoded second value in a memory location.

14. The system of claim 13, wherein the first value and the second value belong to an ordered sequence of values, and wherein the memory further bears processor-executable instructions that, when executed on the processor, cause the system at least to:
- before executing the first thread, replace each contiguous sequence of one or more zeros in the ordered sequence of values with a reserved number representing the number of zeroes in the contiguous sequence of zeros, the reserved number having a value outside of a range of values allowed for the first value or the second value.

15. The system of claim 14, wherein the memory further bears instructions that, when executed on the processor, cause the system at least to:
- insert a second reserved number into the ordered sequence between each pair of non-zero values, the reserved number having a value outside of a range of values allowed for the first value, the second value, or a value used to represent zero.

16. The system of claim 13, wherein the encoded first value comprises a right prefix representing a rightmost number of bits, and wherein the instructions that, when executed on the processor, cause the system at least to execute the first thread on the graphics processing unit (GPU) to encode the first value with the second encoding scheme, based on the first value and the reference value further cause the system at least to:
- execute the first thread on the GPU to encode the first value with the second encoding scheme, such that the binary representation of the first value equals the binary representation of the right prefix.

17. The system of claim 13, wherein the instructions that, when executed on the processor, cause the system at least to store the encoded first value and the encoded second value in a memory location further cause the system at least to:
- store a reference to a first number of bits and a reference to a second number of bits in a second memory location, the first number of bits representing the encoded first value in binary, and the second number of bits representing the encoded second value in binary.

18. The system of claim 17, wherein the instructions that, when executed on the processor, cause the system to at least execute the first thread on the GPU to encode the first value with the second encoding scheme further cause the system at least to:
- execute the first thread on the GPU to determine the reference to the first number of bits, based on the first value and the reference value; and
- wherein the instructions that, when executed on the processor, cause the system to at least execute the second thread on the GPU to encode the first value with the second encoding scheme further cause the system at least to:

execute the second thread on the GPU to determine the reference to the second number of bits, based on the second value and the first value.

19. The system of claim 17, wherein the first value is stored as a first representation of a data type and the second value is stored as a second representation of the data type, the data type having a number of data type bits, the number of data type bits being greater than the representation of the first number of bits or the representation of the second number of bits, and wherein the memory further bears instructions that, when executed on the processor, cause the system at least to:

store in a bitstream the rightmost number of bits of the first representation of the data type equal to the representation of the first number of bits; and store in the bitstream, in a position immediately after the rightmost number of bits of the first representation of the data type, the rightmost number of bits of the second representation of the data type equal to the representation of the second number of bits.

20. A computer-readable storage device for parallelized entropy encoding of a first value and a second value of an ordered set of values, bearing computer-executable instructions that, when executed on a computer, cause operations comprising:

executing a first thread on a graphics processing unit (GPU) to entropy encode the first value, based on the first value and a reference value, the reference value being separate from the ordered set of values;

while executing the first thread on the GPU, executing a second thread on the GPU to entropy encode the second value, based on the second value and the first value; and storing the encoded first value and the encoded second value in a memory location.

* * * * *